United States Patent [19]
Beus et al.

[11] 3,872,719
[45] Mar. 25, 1975

[54] ROCK BOLT TENSION LOAD CELL

[75] Inventors: Michael J. Beus, Spokane; Earl L. Phillips, Newman Lake, both of Wash.

[73] Assignee: The United States of America as represented by the Secretary of the Interior, Washington, D.C.

[22] Filed: Oct. 24, 1973

[21] Appl. No.: 409,104

[52] U.S. Cl............................ 73/88 F, 116/DIG. 34
[51] Int. Cl. .............................................. G01b 7/16
[58] Field of Search............... 73/88 E, 88 F, 141 A; 85/62; 116/DIG. 34

[56] References Cited
UNITED STATES PATENTS

| | | | |
|---|---|---|---|
| 3,104,645 | 9/1963 | Harrison | 85/62 |
| 3,124,770 | 3/1964 | Ciavatta | 73/141 |
| 3,133,468 | 5/1964 | Cummings | 73/88 |
| 3,169,440 | 2/1965 | Taylor | 73/88 |
| 3,238,731 | 3/1966 | Seifert et al. | 85/62 |
| 3,478,523 | 11/1969 | Reusser et al. | 85/62 |
| 3,541,844 | 11/1970 | Stover | 73/141 |

FOREIGN PATENTS OR APPLICATIONS

| | | | |
|---|---|---|---|
| 778,580 | 2/1968 | Canada | 85/62 |

*Primary Examiner*—Herbert Goldstein
*Attorney, Agent, or Firm*—Gersten Sadowsky; William S. Brown

[57] ABSTRACT

A stress measuring mechanism including a load cell having a shell-like body characterized by hemispherical and cylindrical sections and employing strain gages welded to its cylindrical section, is adapted for use on an emplaced rock bolt by a flanged washer having a circular concave portion maintained in engagement with a convex portion of the aforesaid hemispherical section. The mechanism is sandwiched between a bearing place in contact with the aforesaid flanged washer and securing nuts on the rock bolt which bear on a platen part of the load cell. A preferred material for the shell-like body is a titanium alloy.

5 Claims, 1 Drawing Figure

PATENTED MAR 25 1975
3,872,719
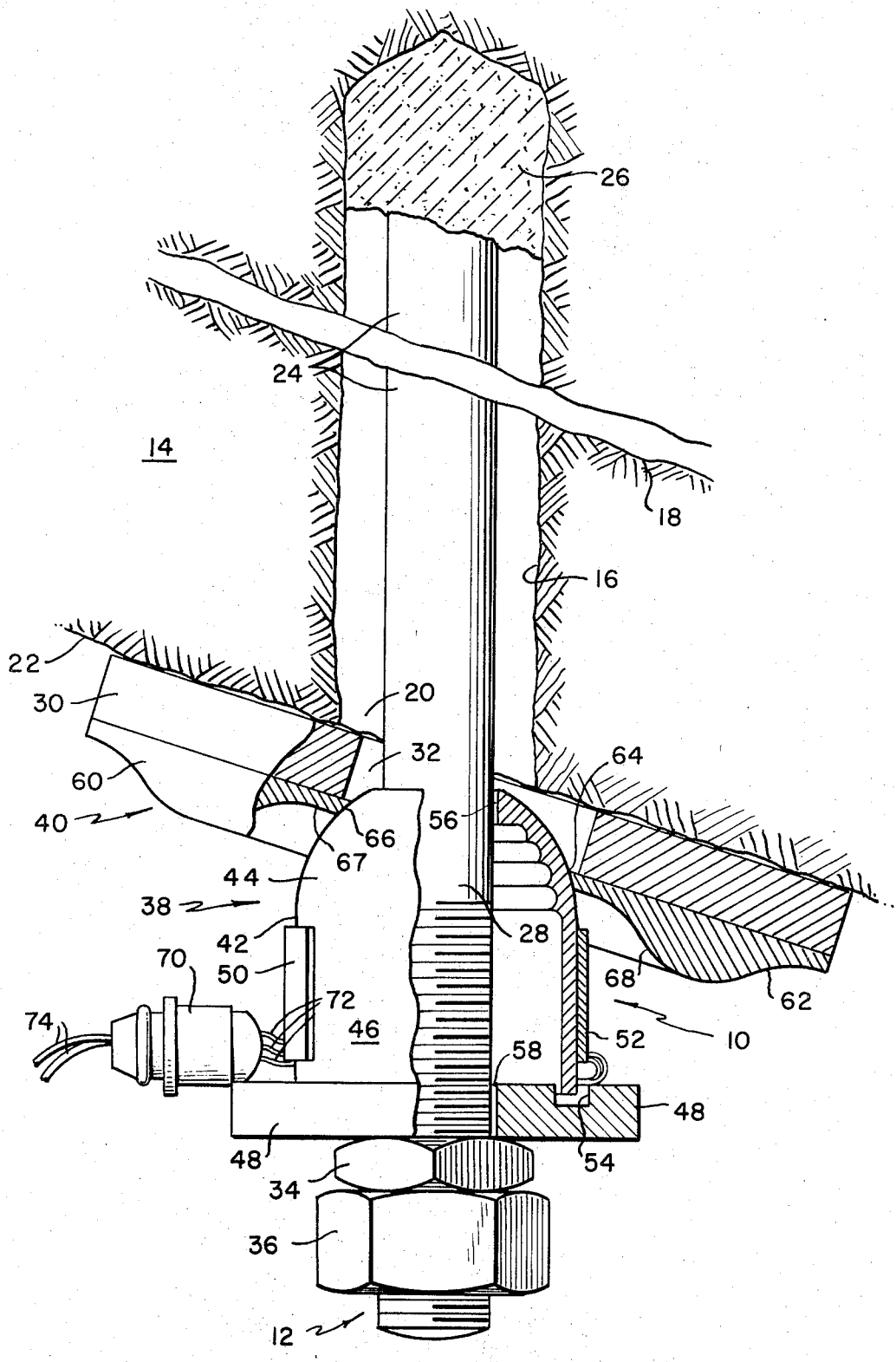

ROCK BOLT TENSION LOAD CELL

The present invention is in a stress measuring means, and more particularly it relates to a mechanism for determining axial tensile load on an elongated fixture which in its usual functional dispositions is often unsatisfactorily situated for optimum operational association with the mechanism. It thus has special utility for measuring stress in rock bolts which have been placed in a mine roof where they support the rock strata of the immediate roof in a manner which will be more fully understood by reference to the U.S. Bureau of Mines Report of Investigation No. 5746, entitled "Determining the In-Place Support of Mine Roof With Rock Bolts," White Pine Copper Mine, Michigan, by R. H. Merrill et al, published in 1961. Electrical strain gages, which are employed in stress measuring mechanisms in connection with indicating bridge circuitry, such as disclosed in U.S. Pat. No. 3,541,844, granted Nov. 24, 1970, to J. H. Stover III, when affixed to bolts installed at an angle to the rock face at a mine roof, as is frequently the case, become subject to extraneous forces such as due to bending, and consequently unreliable for axial stress determination. Adverse effects of angularly directed forces on the mechanism of the present invention are effectively overcome by its adaptation of a simple structural arrangement for use on rock bolts. This mechanism is constructed in a manner, and with materials which predisposes it to have a high degree of sensitivity, and exceptionally long periods of trouble-free operational utility in the adverse environment encountered in mining activities.

Stress measurement in a bolt-like element, such as a stud, was dealt with in U.S. Pat. No. 3,124,770, granted Mar. 10, 1964, to A. Ciavatta. Load on a hook suspended from a hoist block arrangement, disclosed by Ciavatta, is transferred to a fixed part of the block through the stud, and by way of a load cell from which the stud is suspended. Characterizing this load cell is its tapering form adapted to maintain strain gages affixed thereto in the line of action of the stresses applied. A concave spherical surface of the stress applying portion of the load cell is engaged by a convex spherical surface of a nut affixed to the extended end of the stud such that the cell is strained between the aforesaid nut and the fixed part of the block with supports the stress resisting base portion of the cell. In contradistinction to Ciavatta's structural configuration, the mechanism of the present invention includes a load cell adapted to be maintained axially aligned with the bolt, and thus readily positioned therewith at askew angles to the mine roof surface as necessitated by the lay of the roof with respect to the orientation of its stratification, and a retainable member loosely fitted to the bolt which uniquely accommodates the load cell in a cooperative relationship with a load resisting rock face bearing plate conventionally associated with a rock bolt, whereas the stress resisting base component of the load cell is subject to a force applied thereto by a torquing action on nuts which stress the bolt. Extraneous forces on the load cell of the present invention which are likely to arise from a shearing action or the aforementioned bending are avoided by having the stress applying portion of the cell and its accommodating member engage through a ball and pivot action. Although such ball and pivot engagement in other forms thereof is known to the art, as for example, in the dynamic cooperation of weighing apparatus disclosed in the U.S. Pat. No. 3,284,749, granted Nov. 8, 1966, to G. L. Fouretier, and U.S. Pat. No. 3,621,927, granted Nov. 23, 1971, to A. N. Ormond, as well as in the previously identified patent to Ciavatta, its unique adaptation to the particular components of a rack bolt, as disclosed herein, significantly advances the art in overcoming the drawbacks of extraneous loading conditions heretofore normally encountered in conventional load cells used for securing the requisite determinations of axial stress in emplaced rock bolts. Moreover, load cells for rock bolt applications have conventionally had aluminum or steel cell bodies, and strain sensing components therefor have included hydraulic fluid devices, springs, and epoxy bonded strain gages, all of which are subject to untimely deterioration. On the other hand, a simplified yet rugged construction which characterizes the present invention, including the use of titanium alloy for its load cell body having weldable strain gages affixed thereto, provides a stress measuring mechanism uniquely suited to the requirements of rock bolts for use under severe conditions as in a mine.

An object of the present invention is therefore to provide an economical, long-life, and accurately sensitive, axial stress measuring mechanism conveniently applicable to a conventional rock bolt in connection with the installation of the bolt.

Other features and advantages of the invention will appear from the following description thereof taken in connection with a drawing of this case wherein a sole FIGURE is an elevational view, partly in section, of the invention as applied to a rock bolt installed in a mine roof.

With reference to the FIGURE of the drawing, a strain sensing mechanism 10 is shown assembled, in accordance with the present invention, and cooperatively associated with a rock bolt installation 12 at a mine roof 14. Installation 12 is facilitated by a borehole 16 passing generally vertically through stratified roof rock layers 18 from an opening 20 in face 22 of the roof. A threaded rock bolt 24 which is anchored at the far or deep end of borehole 16 by a cemented connection 26, or a mechanical anchor, spans the length of the borehole and extends vertically out of roof opening 20 where the near end of the bolt constitutes a threaded projection 28 from roof face 22. A conventional square bearing plate 30 of installation 12 is traversed by bolt projection 28 at a central opening 32 in the plate. Opening 32 provides sufficient clearance about the bolt for an inclination of plate 26 with respect to the vertically disposed bolt which allows the plate to lie flat in contact with roof fact 22 even though the roof may have a relatively steep slope. Installation 12 further includes nuts 34 and 36 which by ordinary adjustments thereof on the extended end of bolt projection 28 are locked together for turning the bolt as required, and tightening plate 30 in place so as to apply the desired torquing effect initiating strain in mechanism 10, as will be hereinafter more fully explained.

Comprising strain sensing mechanism 10 are a load cell unit 38, and a doughnut shaped washer 40 which are arranged to interact between bearing plate 30 and torquing nut 34 of installation 12. Characterizing load cell 38 are a shell-like body 42 distinguished by a hemispherical portion 44 having a cylindrical extension 46 which at its base seats within a square platen 48, and a pair of strain gages 50 and 52 which, respectively, are welded to opposite sides of cylindrical extension 46.

The circular base rim of cell body 42 is held friction fitted in a conforming groove 54 on the inner face of platen 48, and a central opening 56 of the cell body, which tops hemispherical portion 44 thereof, is aligned with an underlying opening 58 centered in base platen 48 so as to facilitate the mounting of mechanism 10 on bolt projection 28. Doughnut washer 40 has a generally conventional configuration including a square base flange 60 from which developes a rounded ridge 62 forming a semi-torus about a central circular opening 64 therein. Washer opening 64 is circumscribed by a machined edge which forms an upwardly inclined concave surface 66 from a narrow flat rim 67 which is in turn carried to a circular rounded surface 68 of ridge 62. An assembly of mechanism 10 in its operative association with installation 12 finds washer flange 60 in contact with bearing plate 30, and washer opening 64 situated where it is traversed by bolt projection 28 with adequate clearance in the opening to allow the washer an inclination which follows that of the bearing plate. Load cell 38 is thereafter located by its mounting on bolt projection 28 so as to bring into contact an area of convex surface of hemispherical portion 44 with an area of concave surface 66 on the doughnut washer. Consequently, as torquing nuts 34 and 36 are turned to draw them up on anchored rock bolt 34 and against platen 48, the resultant force compresses cell body 42 on washer 40, and in turn is transmitted through washer flange 60 to where it clamps bearing plate 30 to mine roof face 22 in an appropriate manner.

In a preferred embodiment of the invention, load cell body 42 is made of a titanium alloy, and strain gages 50 and 52 are mounted on its cylindrical extension 46 by welding. A conventional pin-socket plug 70, which is secured in an obvious manner to an edge of platen 48, receives therein connective circuit leads 72 from the gages. The resistance of the gages to current flow changes in direct proportion to the change in strain level between the upper and lower points on the cell body spanned by the gages as they appear in the FIGURE of the drawing. The gages are connected in series so as to average the strain at each gage location, and their resistance is measured with a Wheatstone bridge circuit, as was heretofore explained by reference to the previously identified patent to J. H. Stover III. Strain may be read directly from the bridge resistance settings in micro-inches per inch. A load cell is conventionally calibrated in the laboratory under simulated installation conditions and characteristic curves are plotted of applied load versus recorded strain. A subsequent field application of the strain mechanism in the manner heretofore disclosed finds the load cell prestrained to a predetermined value as required to secure the rock bolt installation. Stress in the rock bolt changes in response to rock deformation in the mine roof, and strain on the load cell body varies accordingly. Strain reading at a rock bolt arrangement as shown in the FIGURE of the drawing is taken as desired with bridge circuit instrumentation made applicable therefor by way of its lead 74 to a pin plug 76 which mates with socket 70 to complete connections from the gages 50 and 52 to the instrumentation. The strain readings taken are referred to the aforementioned calibration curve, and the value of the axial tensile load on the bolt is determined therefrom in a conventional manner.

Strain measuring mechanism 10 is constituted by a few basically simple parts which are easily made compatible with readily available rock bolts and bearing plates in common use, and hence is economical for use in large numbers. Welding used in mounting the strain gages on a load cell body obtains in the mechanism exceptional reliability and long life for its cell as used in a mining environment, and this construction together with the use of titanium alloy for the load cell body results in a superior sensitivity. Further, a ball and socket action which is permitted by the engagement of concave and convex surfaces on the load cell body and the doughnut washer, respectively, in response to a tensioning of the rock bolt enables a transfer at these surfaces of the applied forces in a direction parallel to the axis of the load cell, and thus the elimination of concentrated loads which would otherwise occur if the bolt was installed at an angle to the rock roof face. The ball and socket have the same sphericity, and may be lubricated to alleviate problems caused by shear forces between the bearing plate and load cell interface.

Other modifications and variations in the details of the present invention are possible in light of the disclosure herein. It is therefore to be understood that within the scope of the appended claims the invention may be practiced otherwise than as specifically described.

We claim:

1. An arrangement for measuring stress in an enlongated element affixed to a substance subject to deformation, said substance having an external surface and an internal surface wherein one end of said element is fixedly anchored and a portion thereof projects from said substance such that an opposite end of said element is situated beyond said external surface, including a bearing means slackly fitted on said element and adapted to be maintained in pressured contact with said external surface by pressure applying means engaging said element adjacent said opposite end thereof and settable by adjustments thereof on said element, an improvement in said arrangement comprising resilient means having connections to a strain signal detecting and indicating apparatus and operable in response to strain developed therein to affect the signal detected and indicated by said apparatus, a resilient structure comprising a shell-like body with which said resilient means are rigidly bound, said shell-like body having a convex portion at one end and a rim portion at an opposite end, and a planar part which is engaged by said rim portion and in contact with said pressure applying means, and a further means slackly fitted on said element adjacent said bearing means and having a concave portion and a planar portion, said planar portion contacting said bearing means and said concave portion contacting said convex portion of said shell-like body, whereby adjustments of said pressure applying means produces a force acting through said planar part, said shell-like body, and said further means which maintains said bearing means in pressured contact with said external surface.

2. The arrangement of claim 1 wherein said shell-like body of said resilient structure comprises a hemispherical section having said convex portion, a cylindrical section with which said resilient means are intimately bound, and a platen constituting said planar part in which said rim portion of said cylindrical section is securely fitted.

3. The arrangement of claim 2 wherein the material for said hemispherical and cylindrical sections is a titanium alloy, and said resilient means is intimately bound to said cylindrical section by welding.

4. The arrangement of claim 1 wherein said further means slackly fitted on said element is a washer comprising a flange section constituting said planar portion thereof, and a semi-torus section integrally formed with said flange section, and encircling said concave portion of said washer.

5. The arrangement of claim 1 wherein said substance is stratified rock constituting a roof in a mine, said element is a threaded rock bolt, said bearing means is a plate having a central opening which is traversed by said projected portion of said rock bolt when said plate is maintained in pressured contact with said external surface of said mine roof, and said pressure applying means are nuts engaging threads on said rock bolt.

* * * * *